(No Model.)

H. W. AVERY.
METALLIC WHEEL.

No. 413,884. Patented Oct. 29, 1889.

WITNESSES.
Frank L. Miller.
N. K. Devereux.

INVENTOR.
Henry W. Avery
by his attorneys
Watson & Thurston

UNITED STATES PATENT OFFICE.

HENRY W. AVERY, OF CLEVELAND, OHIO.

METALLIC WHEEL.

SPECIFICATION forming part of Letters Patent No. 413,884, dated October 29, 1889.

Application filed May 9, 1889. Serial No. 310,097. (No model.)

*To all whom it may concern:*

Be it known that I, HENRY W. AVERY, a citizen of the United States, residing at Cleveland, in the county of Cuyahoga and State of Ohio, have invented certain new and useful Improvements in Metallic Wheels, of which the following is a full, clear, and exact description, reference being had to the accompanying drawings, in which—

Figure 1:
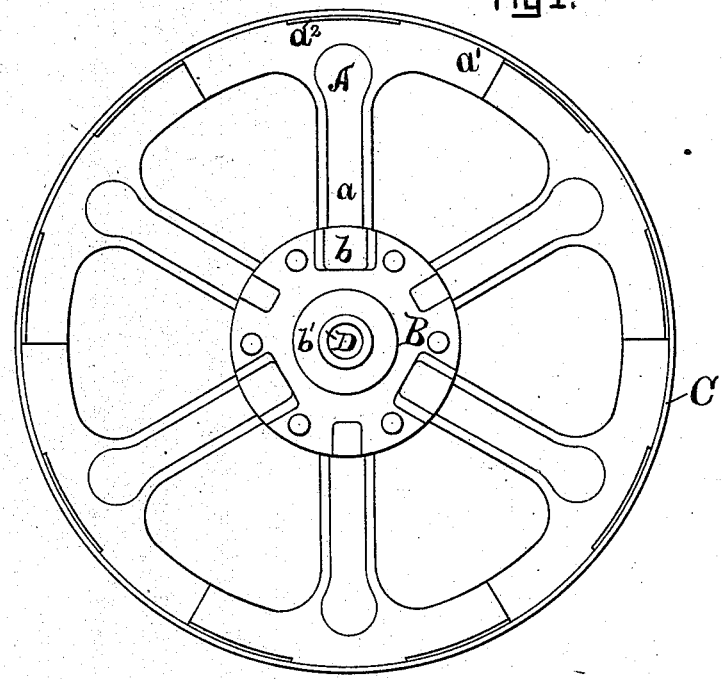
Figure 2:
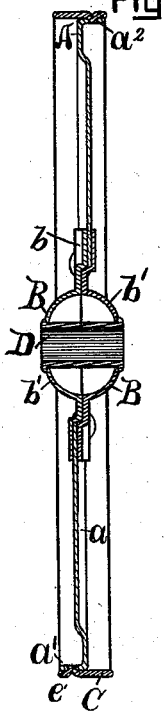
Figure 3:
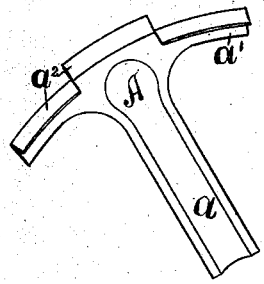
Figure 4:
Figure 5:
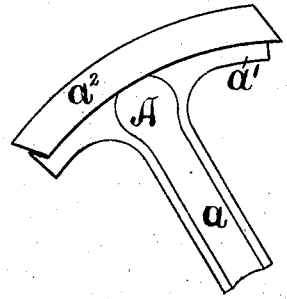
Figure 6:
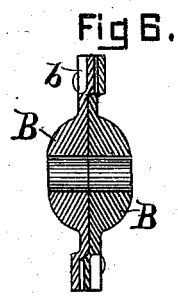

Figure 1 is a side elevation of a wheel embodying my invention. Fig. 2 is a central sectional view of the same. Figs. 3 and 5 are detached perspective views of two of the sections A which enter into the construction of the wheel. Fig. 4 is an enlarged transverse section through one of the spokes. Fig. 6 is a central sectional view of a modified form of the hub-pieces.

The object of my invention is to make a cheap metallic wheel. In all manufactories where sheet-metal articles are made there will remain many small pieces which have hitherto been of little value except as scrap. These small pieces of scrap I propose to utilize in the manufacture of the wheels herein shown and described.

The essential features of the invention, whereby I am enabled to utilize this scrap, consists in making the wheel in sections, each section comprising a spoke, a part of the rim, and a flange turned over from the said rim, and in combining these sections with two hub-pieces having radial sockets in which the ends of the spokes are secured.

It also consists of certain details of construction, which are herein described, and pointed out definitely in the claims.

I will now proceed to describe the embodiment of my invention shown in the drawings.

Referring to the parts by letter, A represents a section of the wheel having the following integral parts, viz: a spoke $a$, a part of the rim $a'$, and a turned-over flange $a^2$. In the form shown the flange $a^2$ is bent, a part to one side of the rim and a part to the other side, as shown in Fig. 3, or first to one side and then backward to the other, as shown in Fig. 5, the object of thus bending the flange to both sides of the rim being to give a broad support to the tire C.

B B represent the hub-pieces, which consist, essentially, of two disks having radial grooves $b$ extending from their edges inward, whereby when the two disks are secured together sockets are formed between them, in which the ends of the spokes are secured. In the form of these hub-pieces shown in Fig. 2 they are also made from sheet metal and have cup-shaped central parts $b'$. A pipe D, with its ends upset to hold it in engagement with the hub-pieces, forms the box. The hub-pieces may also be made of cast-iron in the form shown in Fig. 6, in which case the box D would be unnecessary. These hub-pieces are fastened together by rivets, which may or may not pass through the spokes.

The sections A may be all of the same shape—that is, made between the same dies—in which case they are turned in opposite directions, so that the spokes, when the wheel is completed, are bent alternately in opposite directions, thereby adding to the strength of the structure.

The tire C fits upon the flange $a^2$, and is secured thereto by means of holes made in one part, into which the other part is bent, substantially as shown at $e$ in Fig. 2.

Having thus described my invention, what I claim as new, and desire to secure by Letters Patent, is—

1. The combination of the sections A, each having a spoke $a$, a rim $a'$, and a turned-over flange $a^2$, with two hub-pieces having radial sockets which receive the ends of said spokes, substantially as and for the purpose specified.

2. The combination of the sections A, each having a spoke $a$, a rim $a'$, and a flange $a^2$, bent to both sides of the rim, with two hub-pieces having radial sockets which receive the ends of the spokes, substantially as and for the purpose specified.

3. The combination of a sheet-metal wheel having a turned-over annular flange with a tire, said tire and flange being connected by bending one part into holes in the other part, substantially as and for the purpose specified.

HENRY W. AVERY.

Witnesses:
E. L. THURSTON,
W. J. BAINBRIDGE.